US006757002B1

(12) United States Patent
Oross et al.

(10) Patent No.: US 6,757,002 B1
(45) Date of Patent: Jun. 29, 2004

(54) TRACK PAD POINTING DEVICE WITH AREAS OF SPECIALIZED FUNCTION

(75) Inventors: Glen A Oross, Corvallis, OR (US); Jacques H Helot, Rotterdam (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/434,844

(22) Filed: Nov. 4, 1999

(51) Int. Cl.[7] .............................................. G09G 5/00
(52) U.S. Cl. ..................................... 345/864; 345/173
(58) Field of Search ................................. 345/856, 859, 345/860, 861, 862, 863, 864, 865, 157, 159, 160, 173, 174

(56) References Cited

U.S. PATENT DOCUMENTS

| | | | |
|---|---|---|---|
| 5,461,711 A | 10/1995 | Wang et al. | |
| 5,748,185 A | 5/1998 | Stephan et al. | |
| 5,757,368 A | 5/1998 | Gerpheide et al. | 345/339 |
| 5,815,141 A * | 9/1998 | Phares | 345/173 |
| 5,825,352 A | 10/1998 | Bisset et al. | 345/173 |
| 5,861,875 A | 1/1999 | Gerpheide | 345/174 |
| 5,880,717 A | 3/1999 | Chan et al. | 345/173 |
| 5,883,619 A | 3/1999 | Ho et al. | 345/163 |
| 5,943,044 A * | 8/1999 | Martinelli et al. | 345/174 |
| 6,262,717 B1 * | 7/2001 | Donohue et al. | 345/173 |
| 6,359,616 B1 * | 3/2002 | Ogura et al. | 345/173 |

OTHER PUBLICATIONS

"Combined–User Interface for Computers, television, Video recorders, and Telephones, Etc.." IBM Technical Disclosure Bulletin, Aug. 1990, vol. 33, Issue No. 3B, p. 116–118 (6 printed pages).*
Search Report, dated Apr. 2, 2003.

* cited by examiner

*Primary Examiner*—Ba Huynh

(57) ABSTRACT

Prescribed areas of a track pad surface are dedicated to one or more prescribed or programmable pointing, clicking, scrolling or hot-key functions. These specialized touch sensing areas are adjacent to a main touch sensing area, and include a tactile cue such as a textured border or textured surface. A visual indication such as a label also may be used to identify the specialized function. A visual cue, such as a light, also may be generated when the user's finger is in a specialized touch sensing area. One specialized touch sensing area is dedicated to correspond to a window scrolling function adding convenience for scrolling web pages, word processing documents, tables and other content windows displayed on a computer screen. An on-off button is included to activate or deactivate the track pad operations.

17 Claims, 6 Drawing Sheets

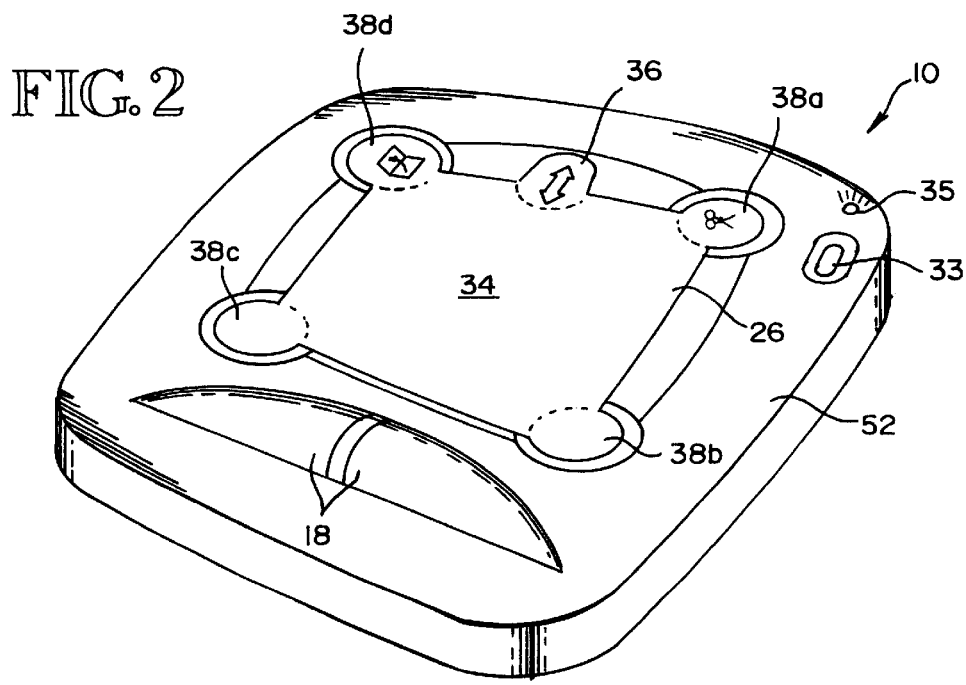
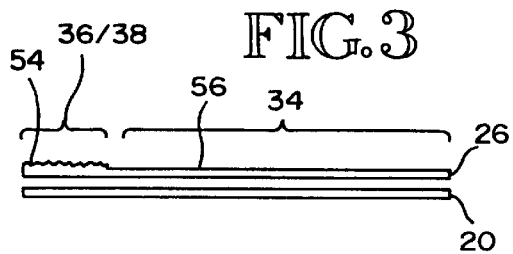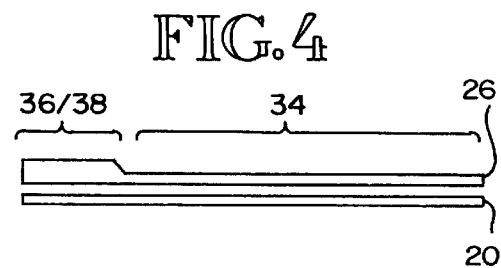
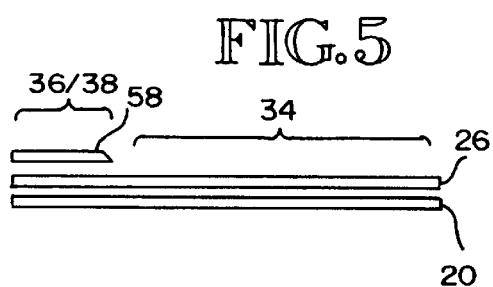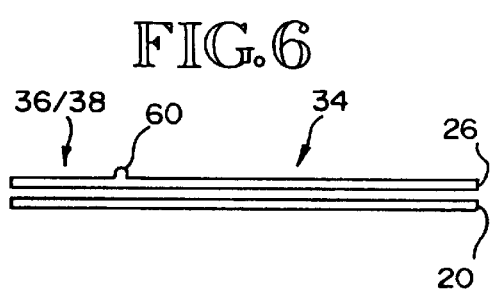
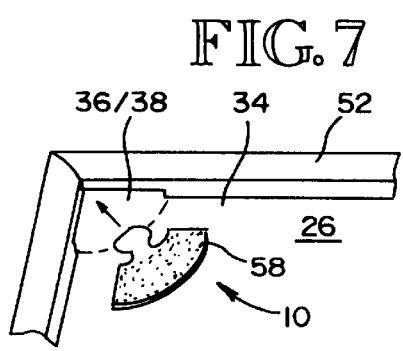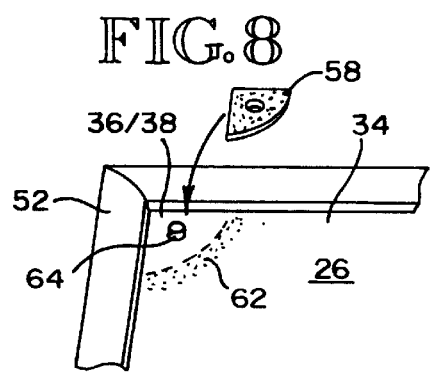

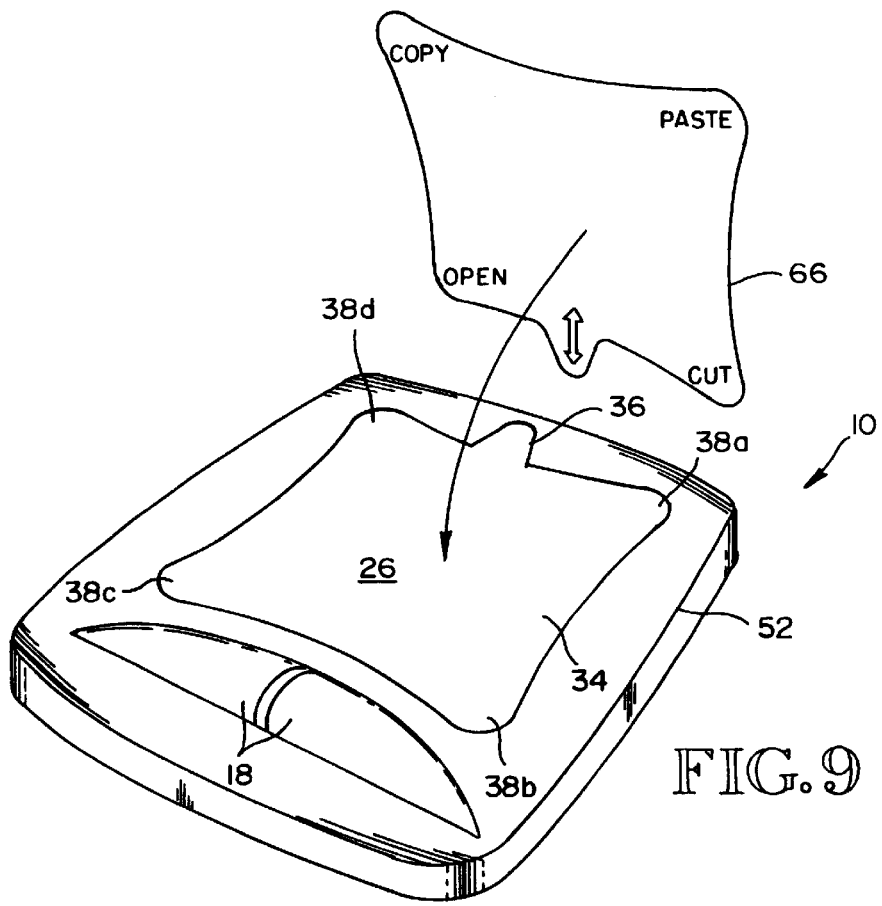
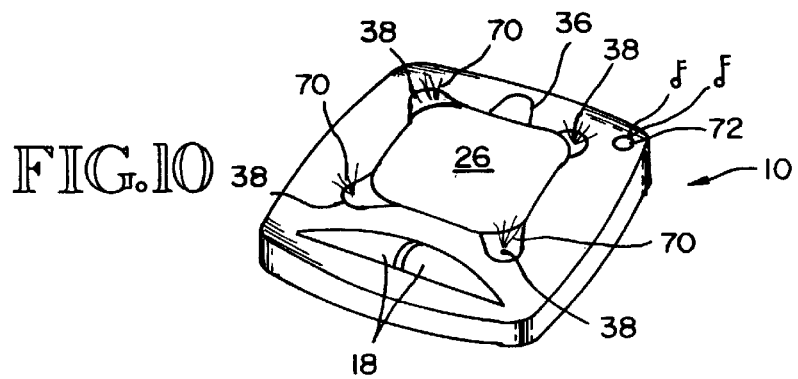
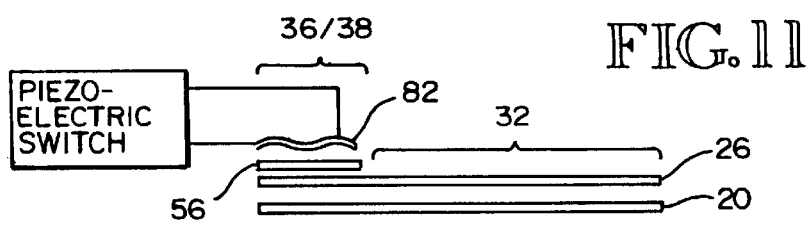

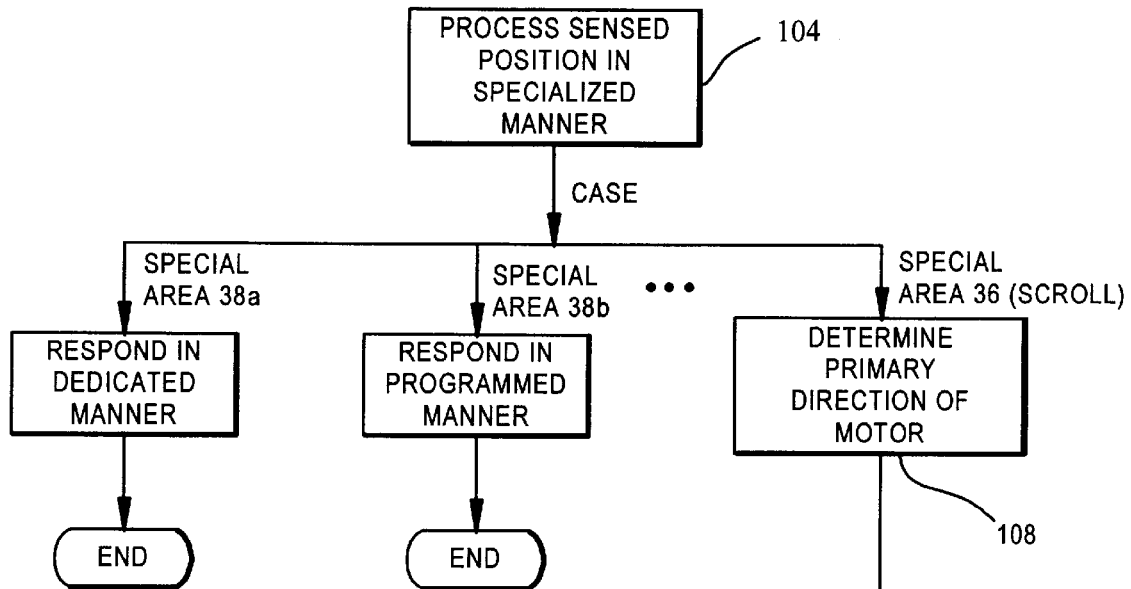
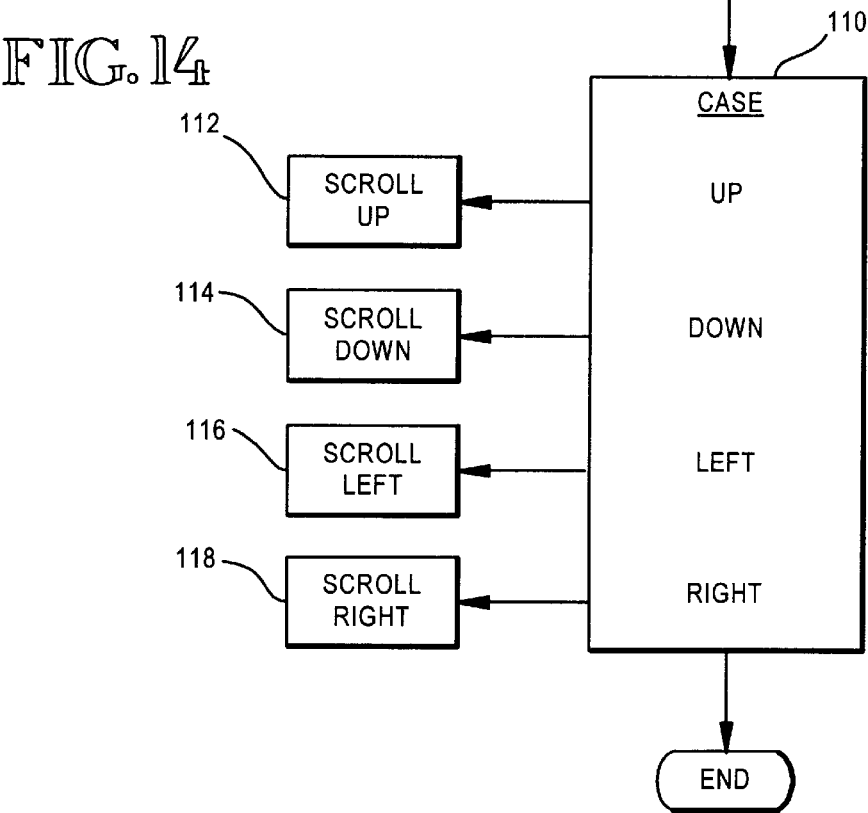
FIG. 14

TRACK PAD POINTING DEVICE WITH AREAS OF SPECIALIZED FUNCTION

BACKGROUND OF THE INVENTION

This invention relates generally to input devices for a computer, and more particularly, to digitizers commonly referred to as track pad devices that control the movement of a cursor on a display screen.

A track pad is a touch-sensing, planar digitizer used in place of a mouse, trackball or joy stick input device on a computer system. An operator places a finger on the track pad and moves the finger along the touch-sensing planar surface. The track pad detects the movement of the finger and in response provides motion signals to the computer. Typically, a track pad driver software program converts the detected movement pattern into specific cursor control signals (e.g., direction and magnitude of motion).

There are three common types of planar digitizers: electrostatic, resistive and capacitive. An electrostatic digitizer includes a tablet that generates an electrostatic field, and a pen that detects time-varying electrostatic field components. A resistive digitizer includes multiple layers of resistive films and protective layers. A protective hard coating is an upper surface onto which an operator applies contact. Underlying are a Y-plane resistive sensing layer and an X-plane resistive sensing layer. Position of an operator's finger is detected along corresponding X and Y-axes. A capacitive digitizer employs a matrix of row and column electrodes used to detect trans-capacitance between specific row and column electrodes or to detect an effective capacitance to virtual ground.

Known enhancements to the operation of the track pad include detecting specific movement patterns and finger combinations. For example, it is known to detect a tapping to emulate the clicking or double-clicking of a mouse button. It also is known to detect an end of surface position and translate such position to mean continue moving the cursor in the same direction. Further, it is known to detect multiple fingers, where one finger is used to control cursor movement and the second finger is used to correspond to a mouse button. For example, the two-finger combination may be used to implement a drag and drop function (i.e., the dragging of an icon or other selected display item(s) to another area of the screen where they are dropped/relocated). In addition, it is known to combine a motion pattern on a track pad with a clicking of an adjacent clicking device to perform the drag and drop function. Accordingly, there have been various techniques for increasing the usability of the track pad as a computer input device. However, as computers are used for applications that require increased interactivity with the user, such as web browsing and multimedia viewing, efficient interactivity by the user is restricted due to the limited functionality of the conventional track pad device. Therefore, there is a need for an improved track pad having additional functions and increased user friendliness.

SUMMARY OF THE INVENTION

A method is implemented for generating commands in a computing apparatus having a display screen. Commands that indicate position in a first manner are generated in response to sensing position within a main touch area. Commands that indicate position in a second manner are generated in response to sensing position within a specialized touch area.

A system which implements the method includes a main touch area capable of sensing position, and at least one specialized touch area capable of sensing position. The main touch sensing area is capable of generating commands indicative of position in the first manner. The at least one specialized touch area is capable of generating commands indicative of position in the second manner.

BRIEF DESCRIPTION OF THE DRAWINGS

FIG. 2 is a perspective view of a track pad apparatus according to an embodiment of this invention.

FIG. 3 is a diagram of layers of an embodiment of the track pad apparatus showing a tactile distinction along an outer surface.

FIG. 4 is a diagram of layers of an embodiment of the track pad apparatus showing a tactilely distinct height variation an outer surface.

FIG. 5 is a diagram of layers of an embodiment of the track pad apparatus showing another tactilely distinct height variation an outer surface.

FIG. 6 is a diagram of layers of an embodiment of the track pad apparatus showing a heightened boundary between adjacent sensing areas.

FIG. 7 is a partial perspective view of an embodiment of the track pad apparatus with an added layer at a special touch sensing area.

FIG. 8 is another partial perspective view of an embodiment of the track pad apparatus with an added layer and tactile protrusion at a special touch sensing area.

FIG. 9 is a perspective view of a track pad apparatus according to another embodiment having a film providing visual indications of functions assigned to respective special touch sensing areas.

FIG. 10 is a perspective view of a track pad apparatus having a light source or sound source for providing a visual cue or an audio cue of finger presence within a special touch sensing area according to another embodiment.

FIG. 11 is a diagram of layers of a track pad apparatus having a piezoelectric switch for providing a vibratory cue during finger presence within a special touch sensing area according to another embodiment.

FIG. 14 is a flow chart of the specialized manner cases in which the track pad apparatus responds.

DESCRIPTION OF SPECIFIC EMBODIMENTS

Problem and Manner of Solving the Problem

The problem addressed is how to achieve more utility from a track pad device. In particular, it is desired to make general and specialized computing tasks easier by expanding the utility of the track pad device. In specific embodiments a solution is achieved by dedicating one or more prescribed areas of a track pad surface to one or more prescribed or programmable computing functions or to various pointing, clicking, scrolling or hot-key functions.

In a specific embodiment, a track pad includes a main touch sensing area and at least one specialized touch sensing areas. The specialized touch sensing areas have a different texture allowing a user to tactilely distinguish the general and specialized sensing areas. Alternatively, only a border between the general touch sensing area and the specialized touch sensing areas have a different texture allowing the user to be tactilely aware of when a finger moves from the general touch sensing area into a specialized touch sensing area.

In some embodiments, a visual indication is generated when the user's finger is in a specialized touch sensing area. In one embodiment, the area lights up, turns color or provides another visual indication. In another embodiment, a specific sound is generated, either at the track pad or by the computer. In still another embodiment a visual indication is generated on the computer display screen, such as a blinking icon in a status bar, menu bar or button bar.

In some embodiments, the specialized touch sensing areas include a visual indication of the specialized function corresponding to operation within the touch sensitive area. For example, a textual or graphic indication overlays the area.

In some embodiments a label or other removable visual indication overlays a specialized touch sensing area. The label includes a textual or graphic indication of the specialized function corresponding to operation within the touch sensitive area. In one embodiment there is a label for a given specialized touch sensing area. In another embodiment there is a removable film that covers both the general and specialized touch sensing areas, where there are indications of the functions labeled for at least the specialized touch sensing areas.

Figure 15:
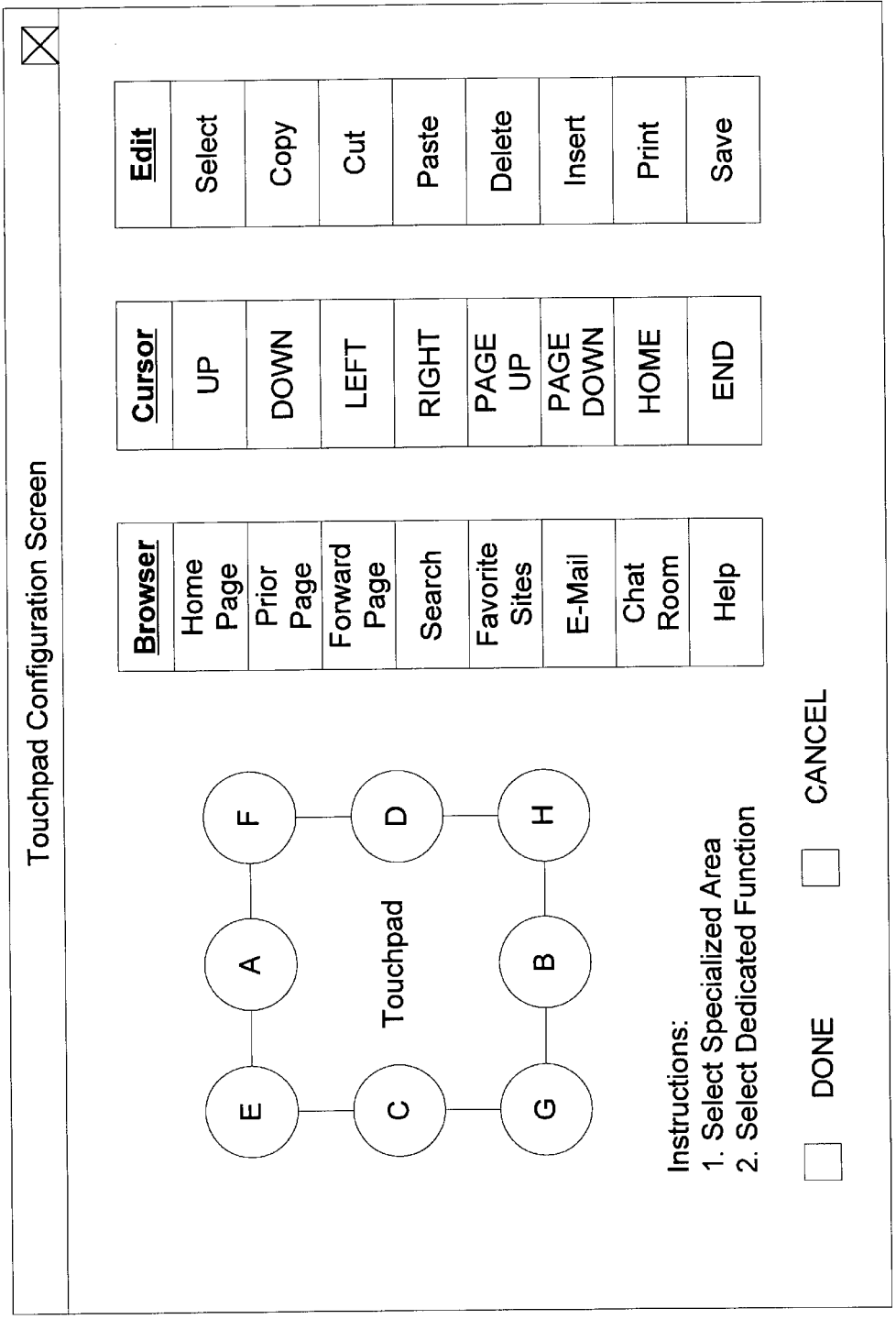
FIG. 15 is an exemplary configuration screen by which a user is able to program specialized manner cases in which the track pad apparatus responds.

In some embodiments the specialized touch sensing areas are programmable by the user to correspond to specific desired functions (see FIG. 15). The functions may be defined by a combination of keys and/or clicks. Accordingly, a programmable touch sensing area may serve as a hot-key, a double click or another function.

The specialized touch sensing area is dedicated in one embodiment to correspond to a window scrolling function for a current window having a scroll bar. Rather than moving a cursor to the scroll bar and holding down a button on the scroll bar or clicking along the length of the scroll bar, operation within the dedicated sensing area automatically scrolls the window (e.g., vertically) with or without repositioning the cursor. This has the advantage of saving time and adding convenience for scrolling web pages, word processing documents, tables and other content windows displayed on a computer screen.

In some embodiments the track pad includes an on/off switch which activates and deactivates the track pad. This is particularly advantageous for embodiments in which the track pad is housed with the keyboard in a portable computer or a stand-alone keyboard where the user may inadvertently invoke the track pad while typing. A visual indicator identifies the on-off status of the track pad to the user.

According to an advantage of these solutions, a user is able to achieve additional functions and increased user friendliness by the inclusion of specialized touch sensing areas on the track pad. According to another advantage, the user is able to program desired hot key combinations or special features to a specialized touch sensing area of the track pad.

Exemplary Embodiments

Figure 1A:
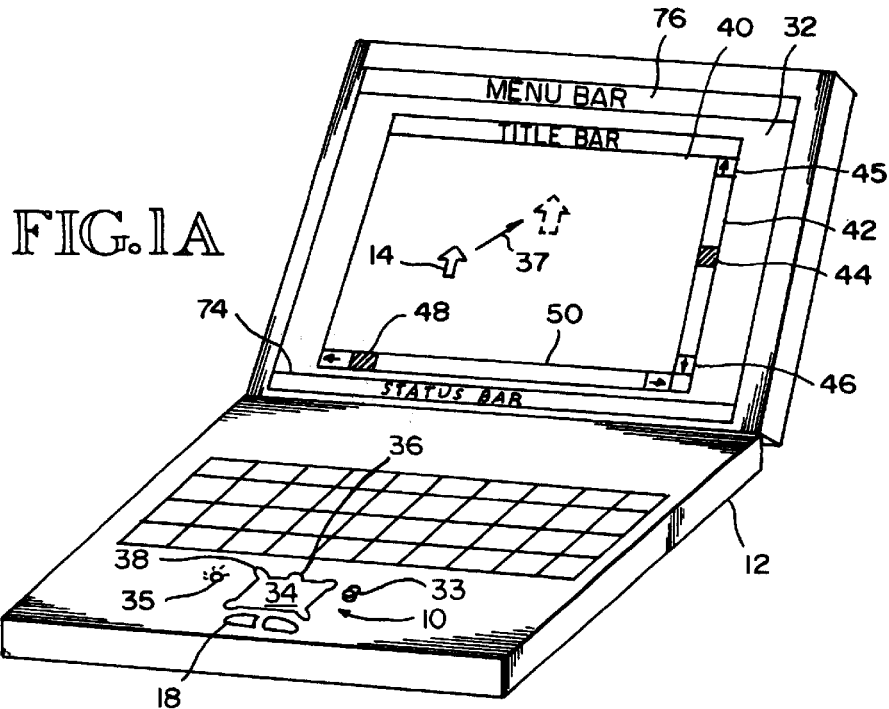
FIG. 1A is a diagram of a track pad apparatus housed as part of a computing system according to one embodiment of this invention.
Figure 1B:
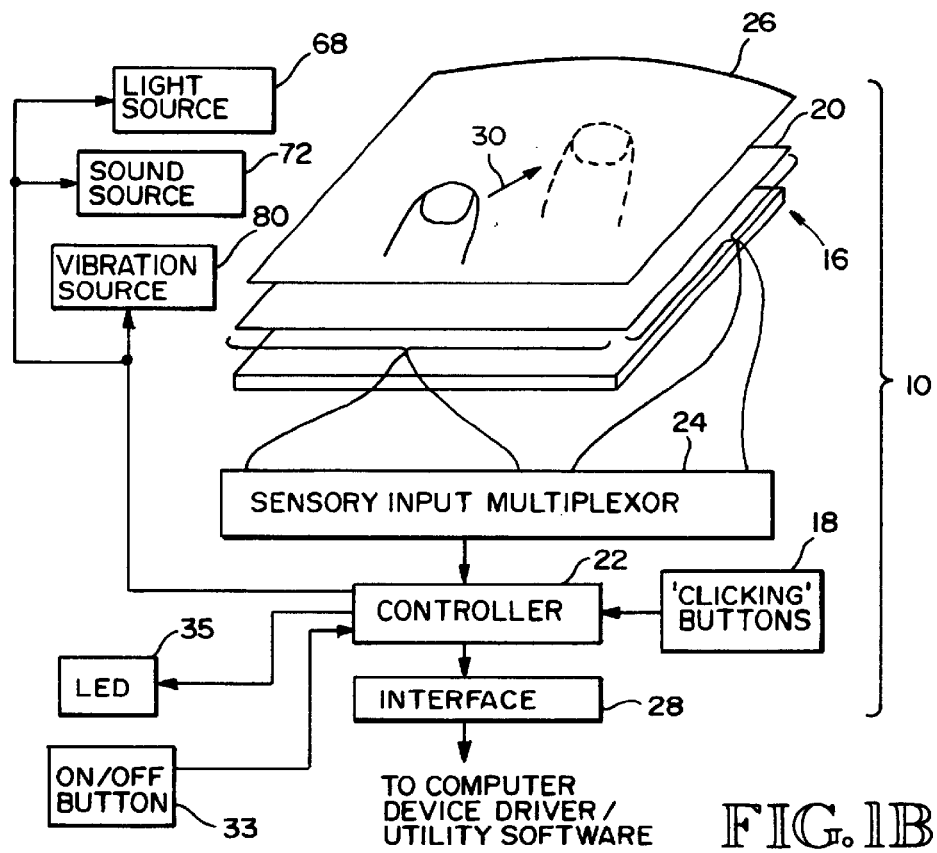
FIG. 1B is a block diagram of a track pad apparatus according to embodiments of this invention.

Referring to FIGS. 1A and 1B, a track pad apparatus 10 is interfaced to a computing apparatus 12 to provide on-screen cursor 14 motion control and other functions. In some embodiments the track pad apparatus 10 is integrated into the housing of the computing apparatus 12 as shown for a notebook computer embodiment in FIG. 1A. In other embodiments the track pad apparatus 10 includes hardware components which are separately housed and coupled to the computing apparatus 12 by a wired or wireless interface connection. The track pad apparatus 10 includes a position detection device 16 and one or more clicking devices 18. The clicking devices 18 are formed by one or more conventional clickable buttons, as of the type commonly found on mouse input devices, track ball input devices and touch pad input devices which are commonly used with graphics interfaces on personal computers.

The position detection device 16 is a digitizer of the resistive-type or capacitive type, and includes one or more active layers 20 that sense finger position. For example, it is known to form a matrix of rows and columns of electrodes in a capacitive type digitizer. Finger pressure alters the capacitance at an area on the layer(s) 20. The rows and columns of electrodes are sampled periodically by a controller 22 through a multiplexor 24. A capacitance measuring device (not shown) also is coupled to the layers 20. In particular, the capacitance detected by the measuring device at a given time corresponds to the row and column electrodes being sampled at such given time. Similarly, in a resistive type digitizer it is known to include a plane of X-oriented resistive film and a plane of Y-oriented resistive film. Such films form the active layers 20. Finger pressure brings the film planes in contact at a given location. The controller 22 receives input from the X-plane and Y-plane active layers 20 and determines a variation in resistance. Such variation corresponds to a location on the device 16.

For either type digitizer, a protective surface 26 overlays the active layer(s) 20 and serves as a tracking surface along which an operator moves their finger. In some embodiments however, a protective surface need not be present or instead is integral to the sensing layer. In response to the detected finger placement on the detection device 16 at a given time, the controller 22 sends control commands to a host computing device 12 through an interface 28. In various embodiments analog or digital signals are generated. When analog signals are generated they are converted into digital format at the interface 28. In one embodiment the track pad apparatus 10 is a stand-alone device in communication with the host computing apparatus 12. In such embodiment the interface may be a wired or wireless interface. For example, the interface 28 may be of the industry standard, wired, serial type or parallel type. Alternatively, the interface 28 may be of the wireless, infrared or RF type. In still other embodiments, a proprietary interface may be implemented to provide communication between the track pad apparatus 10 and the host computing device 12. In another embodiment, the track pad apparatus is integral to the host computing apparatus 12. In such embodiment the control signals are routed along a bus within the host computing apparatus 12, and an interface may or may not be present.

In operation, an operator places a finger along the protective surface 26 of the track pad apparatus 10. The position of such finger is detected by the active layer(s) 20 with signals being routed to the controller 22. Control signals then are forwarded to the host computing apparatus 12 indicative of the finger position. As the operator moves the finger along the protective surface 26, the control signal content changes to be indicative of the new finger position. In a preferred embodiment, the host computing apparatus 12 includes non-volatile memory and a processor. The memory stores a computer program (e.g., device driver; system extension) which is executed by the processor to process the control signals received from the track pad apparatus. Specifically, the processor typically generates cursor control commands in response to the control signals. For example, as the operator moves a finger in a direction 30, a cursor 14 on a display screen 32 of the host computing apparatus 12 is moved in a corresponding direction 37. The magnitude and speed of the motion 34 is determined by the executed program or user-selectable parameters accessed by the executed program. In an alternative embodiment, cursor control commands are generated directly by the track pad apparatus 10.

In a preferred embodiment, the track pad apparatus 10 includes an on-off button 33 readily accessible to the user. In an embodiment in which the track pad is integrated into a keyboard or is integrated into a notebook computer case in the vicinity of the keyboard it is common for a user to inadvertently brush the touch sensitive track pad while typing at the keyboard. This causes the on-screen cursor to be moved in the midst of typing, and can become a frustration to the user. Accordingly, an on-off button 33 is provided adjacent to the track pad surface (see FIG. 2). The user readily turns the track pad on and off as needed. While the button 33 is on the off position, the track pad does not send control signals to the computer. Thus, when the operator brushes over the track pad surface 26 the cursor 14 is not inadvertently relocated. When the button 33 is in the on position the track pad 10 functions to sense operator touch and route signals to the computer 12 for control of the on-screen cursor 14. In some embodiments, a light emitting diode 35 or another visual indicator is included in the vicinity of the on-off button 33 to identify the status of the on-off button 33. In other embodiments the button position identifies the on-off status.

In another embodiment the on-off button 33 instead functions to turn specialized function ability of the track pad apparatus 10 on or off. The specialized functions pertain to dedicated or programmed functions responsive to detection of touch within special touch sensing areas 36, 38 (see FIG. 2 and description below). When on, such functions are active. When the button is in the off position, the special touch sensing areas function as general touch sensing areas in one embodiment or are inactive to both general and special touch sensing control in another embodiment.

Special Touch Sensing Areas

According to embodiments of this invention, there is a general touch sensing area 34 and one or more special sensing areas 36, 38 as shown in FIG. 2. The general touch sensing area 34 operates as described above to be used as an input device for controlling cursor movement on a computer screen 32. In addition, the general touch sensing area 34 may be used for allowing an operator to perform additional functions such as those performed on conventional track pad input devices. For example, tapping is detected to correspond to a button "click" or 'double click.' Further, dragging and dropping may be implemented where dragging is achieved with finger motion within the general touch sensing area 34, while a specific icon or block of text is selected. Still further, different finger placements (e.g., one finger, two finger, three finger) may be detected and processed distinctly.

The special touch sensing areas 36, 38 are either dedicated to implement specific functions or are user-programmable to implement desired programmable functions. In some embodiments there is only one special sensing area 36. Such area 36 may be user-programmable in one embodiment, and may serve to implement a dedicated function in another embodiment. In other embodiments there are two or more special touch sensing areas 36, 38. All areas 36, 38 may be user-programmable in one embodiment, and may serve for implementing dedicated functions in another embodiment. Alternatively, one or more areas 36 may be user programmable, while area 38 is implemented for a dedicated function, or vise-versa. Further one area 36 may be programmable while another area 36 serves to implement a dedicated function.

In a preferred embodiment, common active layers 20 implement both the general touch sensing area 34 and the special touch sensing areas 36, 38. More specifically, the stored computer program (e.g., track pad device driver or system extension) in the host computing apparatus 12 processes control signals indicative of position in the general area 34 in one manner, and of position in a given special area 36/38 in another manner. For example, a user can assign a function that is implemented in response to a control signal that indicates finger position in a given special touch sensing area 38a. Alternatively or in addition, the program may implement a dedicated function in response to the control signal that indicates finger position in special touch sensing area 36.

In an alternative embodiment, the active layers 20 define distinct matrices for the respective areas 34, 36, 38a, 38b, 38c, 38d. Respective functions then are assigned (e.g., either programmably or in dedicated fashion) to finger positions detected from one of the respective matrices.

In one embodiment the special touch sensing area 36 is dedicated to controlling vertical scrolling of an active window 40 appearing on the computer display 32 (see FIG. 1B). As the operator moves a finger upward within the area 36 (see FIG. 2), the vertical scroll bar 42 button control 44 is moved upward causing the view in the window 40 to be scrolled upward (view an earlier portion of the contents displayed). Similarly, as the operator moves a finger downward within the area 36, the vertical scroll bar 42 button control 44 is moved downward causing the view in the window 40 to be scrolled downward (view a later portion of the contents displayed). This offers the operator a significant advantage and reduction in time in performing a scroll operation. The conventional method for scrolling a window using a track pad is to (i) move the cursor to the scroll bar 42, (ii) position the cursor on the button control 44, some location in the scroll bar 42 or one of the end arrows 45, 46, and (iii) clicking to achieve a degree of scrolling. Steps (ii) and (iii) are repeated until the desired scrolling is achieved. According to an embodiment of this invention, however, an operator merely positions a finger in the special touch sensing area 36 and moves the finger in the desired scrolling direction. Accordingly, detection of motion in the special touch sensing area 36 is processed to emulate movement of the button control 44 without the need for additional steps of moving the cursor onto the button control 44 and clicking on the button control 44 to drag it to a new position. 44. Any window having a vertical scroll bar can be controlled in this manner. Thus, an operator can scroll down web pages, word processing documents, data tables, and other window contents in a rapid, effective manner. In an alternative embodiment, window scrolling is achieved instead in a horizontal direction by moving a button control 48 along a horizontal scroll bar 50. In still another embodiment the special touch sensing area 36 detects finger motion in bother vertical and horizontal directions and the resulting control signals are processed to control both vertical scrolling and horizontal scrolling of the active window 40.

In the embodiment illustrated, the special touch sensing area 36 for controlling window scrolling is located at an upper center portion of the protective layer 26. Such location is merely exemplary, as the location may be anywhere along the periphery of the general touch sensing area 34, or even concentrically surrounded by the general touch sensing area 34. Still further the special touch sensing area 36 may be physically isolated from the general touch sensing area 34 by a border or other physical barrier, (e.g., part of a housing 52 structure).

In one embodiment there is only one special touch sensing area, area 36 dedicated to controlling window scrolling. In an alternative embodiment there are one or more special touch sensing area 38 included, in addition to, or instead of the special touch sensing area 36. Referring to FIG. 2, there are five special touch sensing areas 36/38. One area 36 as previously described and four special touch sensing areas 38a–d. In various embodiments, the special touch sensing areas 38 are either programmable or dedicated. Exemplary dedicated functions are common operations, such as cut, copy, paste, open, quit, exit, close window, print, save, help, start browser, check e-mail, go to web search engine, go to web home page, back (to prior web page), forward (to forward web page), any function key command, or keypad command. Although a list of dedicated functions is given, there are many other functions that may be dedicated to correspond to detected motion within a given special touch sensing area 34. Preferably, only one function is dedicated to correspond to a given special touch sensing area 38i.

Alternatively or in addition, one or more of the special touch sensing areas 36, 38a–d are programmable by the operator. For example, the operator can access control software associated with the device driver to assign a specific function to position detection or movement detection within a corresponding special touch sensing area 38a–d, (or area 36). Any of the functions listed above of the exemplary dedicated functions may be programmably selected or assigned by the operator. Further, any key combination, mouse clicking combination, key and clicking combination, or even a macro may be programmed to correspond to position or motion detection within an associated programmable, special touch sensing area 36, 38. For example, a utility program (see FIG. 15) may be implemented with the device driver to allow the operator to associate a programmable special touch sensing area to a program launch operation, to a user defined menu of buttons, to a sequence of keys and clicks, to any of the keyboard function keys or other keyboard keys, to any of the keypad keys (e.g., cursor arrow keys, insert, delete, home, end, page up, page down), any of the menu commands in any of the application programs. Further, the function programmed to correspond to a given special touch sensing area 38i (or 36) may vary according to the active application. For example, the special touch sensing areas may be programmed to correspond to one set of functions (e.g., select, cut, copy, paste) in one application (e.g., a word processing application) and be programmed to correspond to a second set of functions (e.g., go to web home page, go back a web page, go to search engine web page, list favorite web sites) in another application.

In one exemplary embodiment, the operator builds a palette of buttons during a set-up operation. During normal computing, the palette appears when the operator's finger is detected in a corresponding touch sensing area 36,38. Subsequent detection of motion within the corresponding special touch sensing area tracks movement of a cursor within the palette. To select one button from the palette the operator taps emulating a single click, (or clicks the clicking button 18). The palette remains open until closed by the operator. Alternatively, the palette closes automatically upon selection of a button from the palette. In still another alternative procedure, the palette closes automatically after a prescribed or programmable time-out period. In one alternative the palette stays displayed while finger presence is detected in the corresponding special touch sensing area. Once finger presence is no longer detected, the palette automatically closes. A time-out is used however, to allow finger tapping to be detected and not be treated as a closing (i.e., finger removed) and opening (i.e., finger redetected) of the palette.

Tactile and Visual Distinction of Special Touch Sensing Areas

In a preferred embodiment the special touch sensing areas 36, 38 are adjacent to the general touch sensing area 34 allowing easy transition among such areas. To avoid inadvertent transitions between areas, however, it is desirable to provide either of both or tactile and visual distinction between the general touch sensing area from the special touch sensing areas.

Tactile distinction is provided in one embodiment by having a different texture at the special touch sensing areas than at the general touch sensing area 34. Specifically, referring to FIG. 3, the outer surface 54 which an operator contacts in a special touch sensing area 38 has a different texture than the outer surface 56 at the general touch sensing area 34. Alternatively, or in addition the general touch sensing area 34 may extend to one height as shown in FIG. 4, while the special touch sensing areas 36, 38 extend to a second, preferably greater, height. A reduced height also may be implemented, however. Such greater height or varying texture is achieved in either an integral construction of the protective layer 26 as shown in FIGS. 3 and 4, or by the addition of another layer 58 over the special touch sensing areas 36/38 as shown in FIGS. 5, 7 and 8. In yet another embodiment, the tactile distinction is found only at the border between a respective special touch sensing area 36/38 and the general touch sensing area 34. As shown in FIG. 6, the border may be formed by a protruding barrier 60 raised to a greater height than each of the general touch sensing area 34 and the adjacent special touch sensing area 38. In such embodiment the adjacent special touch sensing area 36/38 is at either the same height or a varied height relative to the height of the general touch sensing area, and is either of the same texture or a varied texture relative to the texture of the protective layer 26 in the general touch sensing area 34.

Still further, in some embodiments, there is a warning textural transition region 62 (see FIG. 8) toward the periphery of the general touch sensing area, although still within the general touch sensing area. This allows the operator to tactilely feel that their finger is getting close to a special touch sensing area 36/38. Such transitional warning region 62 is included in addition or instead of the other tactile distinctions described above.

In still another embodiment, there is a tactile distinction in the form of a protrusion 64 located toward the center of the special touch sensing area 36/38. In an exemplary embodiment, the special touch sensing area 36/38 includes an additional layer 58 over the protective layer 26. Such additional layer 56 includes an opening through which the protrusion 64 extends. Such protrusion serves both as a tactile indicator and to align the layer 56 with the track pad housing 52. In such embodiment the special touch sensing area 36/38 extends to a greater height than the general touch sensing area 34 and also may have a different texture than that of the general touch sensing area 34.

In addition to or instead of the tactile indicators a visible distinction is included in some embodiments. For example, in one embodiment the general touch sensing area appears to be one color, while the special touch sensing areas 36/38 are another color. Further each one of the special touch sensing areas 36/38 may be of the same or a different color than the other special touch sensing areas 36/38. Such coloration is achieved by the color of materials forming the protective layer 26 active layers 20 or additional layers 58 according to the embodiment. In one embodiment, a film is applied to the protective layer to give the various areas 34, 36, 38 desired coloration.

Another visual indication provided in some embodiments is a textual word or abbreviation or a graphic symbol indicative of the dedicated or programmed function of each given special touch sensing area 36/38. In one embodiment a film 66 (see FIG. 9) with such markings is applied over the protective layer 26. In another embodiment, a label is provided respectively (not shown) for each special touch sensing area 36/38. For embodiments in which the function assigned to a special touch sensing area is programmable, it is desirable to include blank labels or a broad selection of labels for the operator to choose from. In addition, it is desirable for such labels to be removable in the event of reprogramming. The labels may vary in color and content. For example, the labels may include only a color without added content. This is desirable for embodiments in which the areas 36/38 have different functions in different applications. Where a function is nonprogrammable and dedicated, it is desirable to permanently provide a visual distinction such as a word, abbreviation, symbol and/or color.

Cue Indicating Active Operation Within Special Touch Sensing Area

Another useful indication is for the operator to receive some cue acknowledging that the computing system 12 or track pad apparatus 10 has detected the operator's finger presence in a special touch sensing area 36/38. In one embodiment, a light source 68 is included with the track pad apparatus. While the operator has a finger positioned within a special touch sensing area 36/38 the light is on providing a visual cue. In various embodiments the light may be one general light for detection of presence in any of the special touch sensing areas 36, 38. In another embodiment there is a light for each special touch sensing area 36, 38. When finger presence is detected in one area 36/38, only the light for that area is on. Such light may be adjacent to the area or even light up the specific area as shown in FIG. 10. FIG. 10 shows each area 38a–d being lit with light 70, although in a preferred embodiment only the area 38i where finger presence is detected is lit.

In an alternative embodiment, sound is used rather than light and the apparatus 10 includes a sound source 72 (see FIGS. 1 and 10), rather than a light source. While, or at the onset of when, the operator has a finger positioned within a special touch sensing area 36/38, a sound goes off providing an auditory cue. In various embodiments the sound may be a common sound for detection of presence in any of the special touch sensing areas 36, 38. In another embodiment there is a different sound for each special touch sensing area 36, 38. When finger presence is detected in one area 36/38, only the sound for that area goes on.

In still other embodiments, the visual cue or audio cue may originate from the computing system 12 rather than the track pad apparatus 10. For example, the visual cue is the display of a flashing status message in the status bar 74 of the application window or main window of the display 32 (see FIG. 1A). In another embodiment the visual cue is a flashing icon on the menu bar 76 of the display 32. In still another embodiment, the cursor 14 on the display 32 changes to a different shaped cursor or a different colored cursor while the operator has a finger positioned within a special touch sensing area 36/38. Alternatively, the cursor 14 changes in some other visual manner (e.g., increased blink rate) for such an indication. Different cursor shapes may appear for the detection of finger presence in the different areas.

In yet another embodiment, a tactile cue is generated while, or at the onset of, when the operator has a finger positioned within a special touch sensing area 36/38. For example, the track pad apparatus 10 includes a vibration source 80 in one embodiment (see FIGS. 1 and 11). Such vibration source preferably includes a piezoelectric material 82 activated in a switch configuration. Placement of a finger in a special touch sensing area closes the switch causing a vibration to occur adjacent to the finger within the activated special touch sensing area. Such vibration is buffered to avoid a false indication at the active layers 20.

Method of Operation

Figure 12:
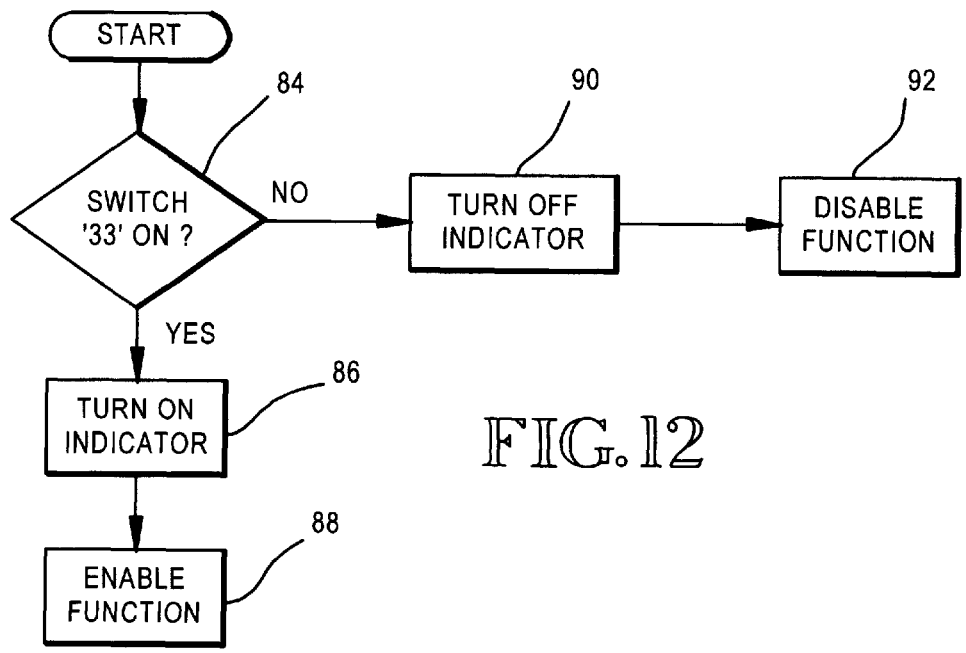
FIG. 12 is a flow chart of the track pad apparatus response to a start-up operation or a toggling of the apparatus on-off switch.

Referring to FIG. 12, at start-up or when the operator toggles the switch 33, step 84 is performed to determine whether the switch is on. If on, then an indicator is generated at step 86 and functionality is enabled at step 88. If off, then the indicator is turned off at step 90 and functionality is disabled at step 92. As previously described the functionality enabled or disabled depends on the embodiment. In one embodiment the track pad apparatus is disabled. In another embodiment only the specialized touch sense areas 36, 38 are disabled. In yet another embodiment, the "specialized response" for specialized touch sense areas are disabled (e.g., they act the main touch sensing area 34).

Figure 13:
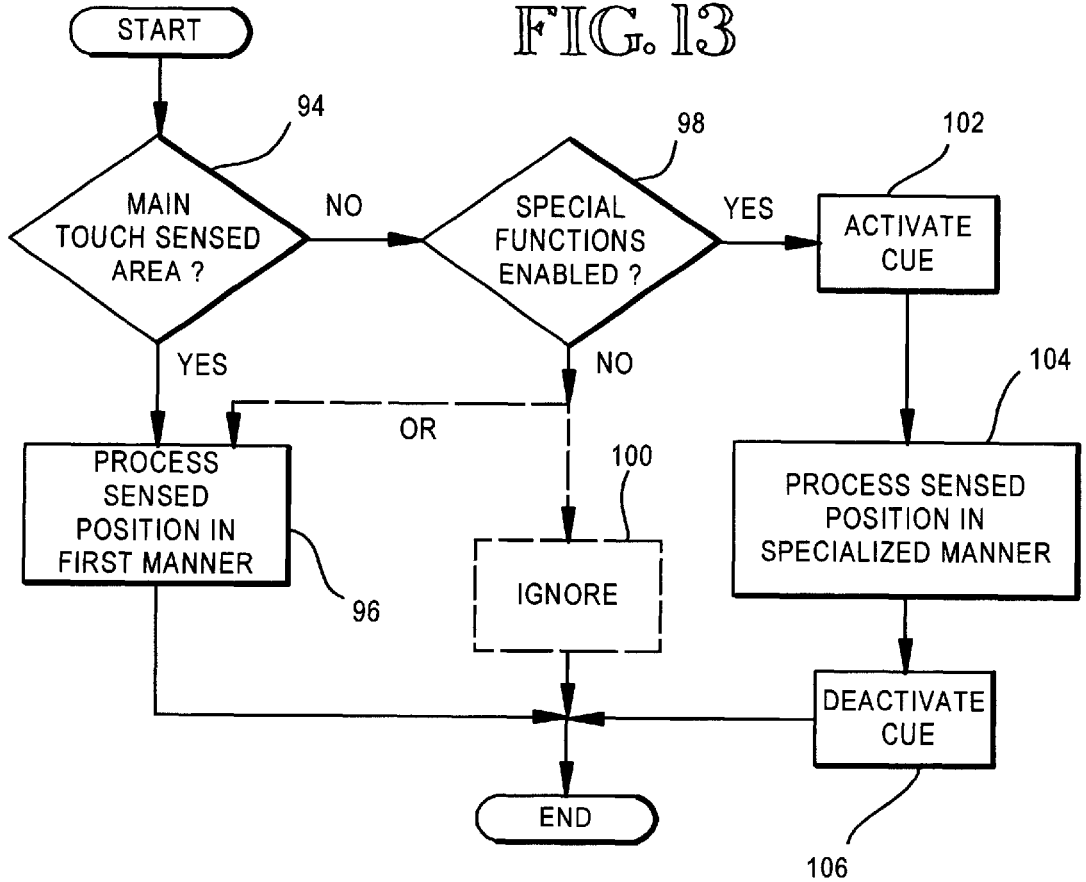
FIG. 13 is a flow chart of the operation of the track pad apparatus.

Referring to FIG. 13, when an operator touches an active track pad apparatus 12, at step 94 a determination is made as to whether it was the main touch area 34. If so, then at step 96, the sensed position is processed in a first manner, (e.g., 'normal'). If the area touched was not the main touch sense area 34 then at step 98 a determination is made as to whether the specialized functions are enabled. If not enabled, then the response depends on the embodiment. If the specialized touch sense areas are to function like the main touch sense area, then step 96 is performed—the sensed position is processed in the first manner. Alternatively, the touch sensing is ignored at step 100.

If the specialized functions are active, then at step 102 a cue is activated to cue the operator that the specialized processing for the specialized touch sense areas is now in process. Such cue may be a visible, audible or tactile cue as previously described. Then at step 104 the sensed position is processed in a specialized manner. Thereafter, the cue is deactivated at step 106.

Referring to FIG. 14, the specialized manner of processing at step 104 is further elaborated in a case determination.

Each area 36, 38a–38d is able to respond in a common or distinct manner. In some embodiments one or more specialized touch sense areas 36, 38a–d are dedicated functions. In other embodiments, the specialized manner for one or more of these areas is programmable. As described above, the operator may program a given area to respond in a select manner (e.g., one of common desktop commands; one of common global computer network browsing commands; one of a specific applications interface commands; a macro of commands determined by the operator). In the illustrated example, area 38a is configured to respond in a dedicated manner to perform some dedicated function. Specialized area 38b is configured to respond in the manner programmably selected by the operator. Specialized area 36 is configured to respond in a dedicated manner for controlling window scrolling. Specifically, at step 108 a primary direction of motion is determined among a set of orthogonal direction possibilities. At step 110, a case analysis is performed on the direction. At steps 112–118, scrolling is performed in one of the four orthogonal directions. In some embodiments scrolling is performed concurrently along two orthogonal axes. For example, scrolling is performed in one direction along an up-down (vertical axis) and in one direction along a left-right (horizontal) axis.

FIG. 15 is an exemplary touchpad configuration screen on a computing system in which the operator can programmably select the manner each specialized area is to respond. In this exemplary screen, the operator selects the specialized area of interest on the touchpad and then selects one of the functions (manner) under the browser, cursor, or edit categories. Other dedicated manners or functions are possible besides those shown in this exemplary configuration screen. Once the operator has programmed the desired specialized areas, the configuration is saved when the operator selects the "done" box.

Meritorious and Advantageous Effects

According to one advantage of the invention, a user is able to achieve additional functions and increased user friendliness by the inclusion of specialized touch sensing areas on the track pad. According to another advantage of the invention, the user is able to program desired hot key combinations or special features to a specialized touch sensing area of the track pad. According to another advantage a dedicated widow scrolling area of the track pad saves time and adds convenience for scrolling web pages, word processing documents, tables and other content windows displayed on a computer screen.

Although a preferred embodiment of the invention has been illustrated and described, various alternatives, modifications and equivalents may be used. Therefore, the foregoing description should not be taken as limiting the scope of the inventions that are defined by the appended claims.

What is claimed is:

1. A system for generating commands in a computing apparatus having a display screen, the system comprising:
   a main touch area capable of sensing position where said main touch sensing area is capable of generating commands indicative of position,
   at least one specialized touch area capable of sensing position and activating at least one computing function that is different from the computing function activated by said main touch area;
   an on/off switch, wherein only the capability of said at least one specialized touch area for activating said at least one computing function is activated and deactivated with said on/off switch; and
   an indicator capable of identifying the on/off status of said generation of commands indicative of position.

2. A computing apparatus, comprising a display screen and a user input apparatus, the user input apparatus comprising:
   a main touch area capable of sensing position wherein said main touch sensing area is capable of generating commands indicative of position, wherein the display screen and main touch area have non-overlapping locations;
   at least one specialized touch area capable of sensing position and activating at least one computing function that is different from the computing function activated by said main touch area;
   an on/off switch, wherein only the capability of said at least one specialized touch area for activating said at least one computing function is activated and deactivated with said on/off switch; and
   an indicator capable of identifying the on/off status of the user input device command generation.

3. The computing apparatus of claim 2, wherein the display screen displays a cursor, wherein the user input device commands determine a placement position of the cursor on the display screen, and wherein said cursor position and a corresponding sensed position are separate.

4. A system for generating commands in a computing apparatus having a display screen located in a non-overlapping manner relative to the command generating system, the system comprising:
   a main touch area capable of sensing position and activating at least one computing function;
   at least one specialized touch area capable of sensing position and activating at least one computing function that is different from the computing function activated by said main touch area wherein said specialized touch area is located adjacent to said main touch area;
   an on/off switch, wherein only the capability of said at least one specialized touch area for activating said at least one computing function is activated and deactivated with said on/off switch; and
   an indicator separate and apart from the position of said on/off switch capable of identifying the on/off status of the capability of said at least one specialized touch area for activating said at least one computing function.

5. The system of claim 4, wherein said at least one computing function activated by said at least one specialized touch area is a dedicated function.

6. The system of claim 4, in which said main touch area and said at least one specialized touch area have different textures.

7. The system of claim 4, in which said main touch area and said at least one specialized touch area are separated by a border having a different texture than said main touch area and said at least one specialized touch area.

8. The system of claim 4, further comprising:
   an indicator that said at least one specialized touch area has sensed position.

9. The system of claim 8, in which the indicator is a visual indicator.

10. The system of claim 9, in which the visual indicator is on the display screen.

11. The system of claim 8, in which the indicator is an audio indicator.

12. The system of claim 8, in which the indicator is a tactile indicator.

13. The system of claim 5, in which said at least one specialized touch area has a visual indication of said dedicated function.

14. The system of claim 13, in which said visual indication is removable.

15. The system of claim 5, in which the dedicated function is programmable.

16. The system of claim 4, in which said at least one computing function that is different from the computing function activated by said main touch area corresponds to a window scrolling function on the display screen.

17. The system of claim 5, in which the dedicated function is selected from a group of common commands consisting of cut, paste, open, quit, exit, close window, print, save, help, start browser, check e-mail, go to web search engine, go to web home page, go to prior web page, and go to forward web page.

* * * * *